United States Patent
Krete

(10) Patent No.: US 9,229,542 B2
(45) Date of Patent: Jan. 5, 2016

(54) MULTI-CONTROL STYLUS

(71) Applicant: RESEARCH IN MOTION LIMITED, Waterloo (CA)

(72) Inventor: Morley E. Krete, Cambridge (CA)

(73) Assignee: BlackBerry Limited, Waterloo, Ontario (CA)

( * ) Notice: Subject to any disclaimer, the term of this patent is extended or adjusted under 35 U.S.C. 154(b) by 302 days.

(21) Appl. No.: 13/857,501

(22) Filed: Apr. 5, 2013

(65) Prior Publication Data

US 2014/0300587 A1    Oct. 9, 2014

(51) Int. Cl.
*G06F 3/0354* (2013.01)

(52) U.S. Cl.
CPC .................. *G06F 3/03545* (2013.01)

(58) Field of Classification Search
CPC .................................................. G06F 3/03545
See application file for complete search history.

(56) References Cited

U.S. PATENT DOCUMENTS

| | | | |
|---|---|---|---|
| 4,513,437 A | 4/1985 | Chainer et al. | |
| 4,536,746 A | 8/1985 | Gobeli | |
| RE34,095 E | 10/1992 | Padula et al. | |
| 5,263,375 A | 11/1993 | Okada | |
| RE35,016 E | 8/1995 | Gullman et al. | |
| 6,324,920 B1 | 12/2001 | DeSchrijver | |
| 6,326,565 B1 | 12/2001 | Holtzman et al. | |
| 6,731,270 B2 | 5/2004 | Tosaya | |
| 7,218,040 B2 | 5/2007 | Toda | |
| 7,279,646 B2 | 10/2007 | Xu | |
| 7,646,377 B2 | 1/2010 | Geaghan | |
| 7,839,394 B2 | 11/2010 | Zloter et al. | |
| 8,131,654 B2 * | 3/2012 | Asano et al. .................. | 705/407 |
| 8,149,227 B2 * | 4/2012 | Marggraff et al. ............ | 345/179 |
| 8,297,868 B2 | 10/2012 | Underwood et al. | |
| 2006/0232570 A1 | 10/2006 | Yuen et al. | |
| 2008/0129709 A1 | 6/2008 | Lin et al. | |
| 2008/0309621 A1 | 12/2008 | Aggarwal et al. | |
| 2011/0157007 A1 | 6/2011 | Chen | |
| 2011/0267182 A1 * | 11/2011 | Westerinen et al. ....... | 340/407.2 |
| 2012/0253699 A1 * | 10/2012 | Kuno .............................. | 702/41 |
| 2012/0268429 A1 | 10/2012 | Lee et al. | |

FOREIGN PATENT DOCUMENTS

| | | |
|---|---|---|
| EP | 0836151 | 4/1998 |
| WO | WO03/058394 | 7/2003 |

OTHER PUBLICATIONS http://www.acecad.com.tw/manual/flair2ug-en.pdf, "USB Graphic Tablet User's Guide", Version 3.40UG, Nov. 1, 2005.

(Continued)

*Primary Examiner* — Andrew Sasinowski
(74) *Attorney, Agent, or Firm* — Thomas Grzesik; Fleit Gibbons Gutman Bongini & Bianco P.L.

(57) ABSTRACT

The present disclosure provides for a stylus having at least one switch located within the stylus body and activated by relative lateral motion between the stylus tip and the stylus body. Haptic or audible feedback may be provided to a user when a switch, or combination of switches, changes state. The stylus may also include an axial switch and an axial force sensor.

18 Claims, 4 Drawing Sheets

(56) References Cited

OTHER PUBLICATIONS http://www.prnewswire.com/news-releases/wacoms-intuos5-pen-tablet-artfully-inspires-creative-expression-141012293.html, "Wacom's Intuos5 Pen Tablet Artfully Inspires Creative Expression", Wacom press release, Vancouver, WA, Mar. 1, 2012.

European Search Report, EP13162612.9, Aug. 14, 2013.

* cited by examiner

MULTI-CONTROL STYLUS

BACKGROUND

A stylus may be employed as a computer input device. Inputs generated by a stylus may include the x-y position of a stylus on a screen or drawing tablet and the contact force between the stylus and a surface. For instance, the x-y position may be employed to interface with a graphical user interface or a drawing application executed on a computer. The pressure applied to a stylus may be sensed by a sensor in the stylus.

An alternative computer input device is a computer mouse. A computer mouse provides x-y position input in addition to inputs from two or more buttons. The buttons may be clicked to select objects of a graphical user interface, or held down to move objects displayed on a screen or to draw lines, for example.

A stylus lacks button functions, while a computer mouse lacks the accurate positional control and force sensing of a stylus.

One prior approach to improving the functionality of a stylus is to add an axial force sensor or switch that responds to stylus contact force. However, this provides only a single control that cannot duplicate the functions of a computer mouse.

An alternative approach is to supply one or external buttons on the housing of the stylus. However, such buttons are not readily activated while the stylus is being moved, since a user must change their grip of the stylus to activate an external button.

It would be useful to provide a stylus with multiple controls that are convenient for use.

BRIEF DESCRIPTION OF THE DRAWINGS

Exemplary embodiments of the present disclosure will be described below with reference to the included drawings such that like reference numerals refer to like elements and in which.

DETAILED DESCRIPTION

Figure 1:
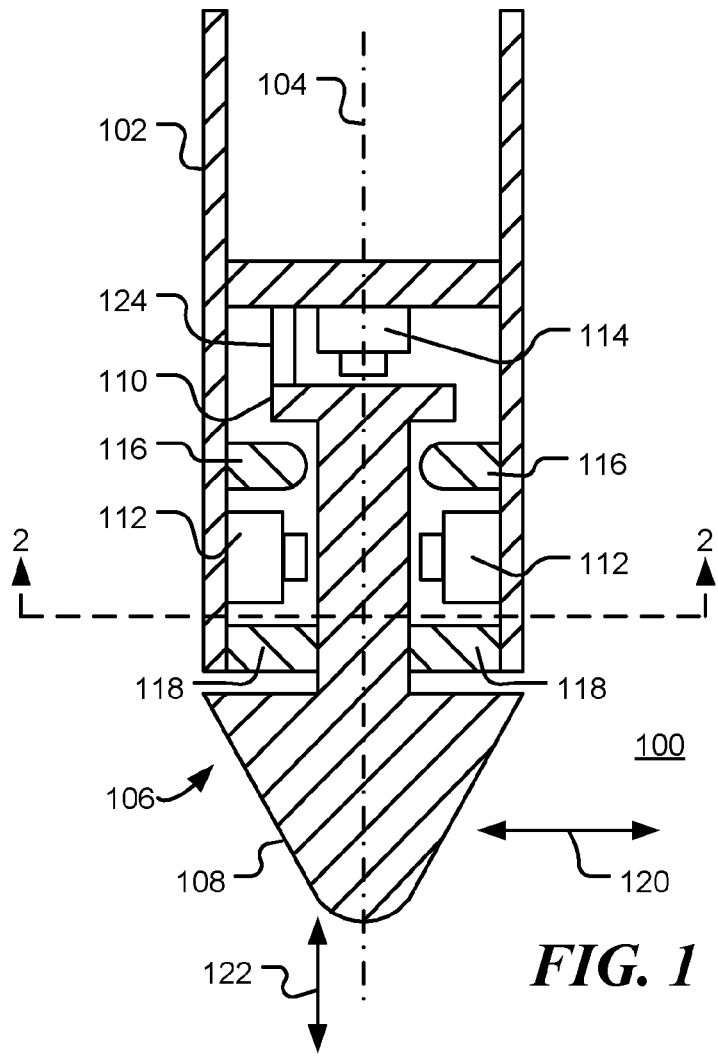
FIG. 1 is a sectional view of a stylus, in accordance with exemplary embodiments of the present disclosure.

For simplicity and clarity of illustration, reference numerals may be repeated among the figures to indicate corresponding or analogous elements. Numerous details are set forth to provide an understanding of the illustrative embodiments described herein. The embodiments may be practiced without these details. In other instances, well-known methods, procedures, and components have not been described in detail to avoid obscuring the disclosed embodiments. The description is not to be considered as limited to the scope of the exemplary embodiments shown and described herein.

One aspect of the present disclosure relates to stylus having a stylus body and a tip having an internal portion constructed and arranged to permit relative lateral displacement between the internal portion of the tip and the stylus body. At least one switch is positioned internal the stylus body in proximity to the internal portion of the tip. The at least one switch is responsive to the relative lateral displacement between the internal portion of the tip and the stylus body. An output is configured to communicate a control signal, dependent upon a state of the at least one switch, to an external electronic device. Optionally the stylus may also include an axial switch to axial motion of the stylus tip relative to the stylus body, and a force sensor responsive to a force applied to the stylus tip.

In operation, the stylus provides an input to an electronic device by providing a first control signal to the electronic device in response to activation of a lateral switch or a combination of lateral switch. A lateral switch is activated by application of force applied the tip of the stylus in a lateral direction. Optionally, the stylus may provide a second control signal in response to activation of an axial switch of the stylus by an axial force applied between the tip of the stylus and the stylus body. Haptic and/or audible feedback may be provided to a user when a switch, or combination of switches, changes state.

The electronic device receives the first and/or second control signals and may use them to control selected aspects of an application executed on the processor. The electronic device may be configured to execute computer instructions stored on transient or non-transient computer readable media.

Under control of computer-executable instructions a processor of an electronic device receives first and second control signals from a stylus. The first control signal is responsive to activation of at least one switch of the stylus by relative lateral motion between a tip of the stylus a stylus body, while the second control signal is responsive to activation of an axial switch of the stylus by relative axial motion between the tip of the stylus and the stylus body. An application executed on the processor is controlled dependent upon the first and second control signals.

FIG. 1 is a sectional view of stylus, in accordance with exemplary embodiments of the present disclosure. The stylus 100 has an elongated stylus body 102 having a longitudinal axis 104, and first and second lateral axes perpendicular to the longitudinal axis 104. A stylus tip 106 has an external portion 108 that extends from an end of the stylus body 102 and an internal portion 110 that is moveably located within the stylus body 102. One or more lateral switches 112 are located within the stylus body 102 and are activated by motion of the internal portion 110 of the stylus tip 106 in response to relative lateral motion between the tip 106 and the stylus body 102. The state of the one or more lateral switches 112 is communicated to an external electronic device to enable control of the electronic device. For example, a software application executed on the electronic device may be controlled by activation of the switches and by motion of the stylus tip across a surface. The lateral switches 112 may be configured to be insensitive to motion of the internal portion 110 of the tip 106 along the longitudinal axis 104. The stylus 100 may also include an axial switch 114 located within the stylus body 102. The axial switch 114 is activated by relative motion between the internal portion 110 of the tip 106, and the stylus body 102, along the longitudinal axis 104. In this configuration, the lateral switches 112 and the axial switch 114 may be controlled independently of one another. Thus the lateral switches 112 and axial switch 114 by be used to provide similar functions to a computer mouse, enabling common mouse functions such as 'click to select' and 'hold to drag' to be performed using the stylus. For example, the axial switch 114 could be programmed to function as a left mouse button and the lateral switches 112 programmed to function, in combination, as a right mouse button.

The lateral and axial switch may comprise miniature switches, such as miniature, snap-action switches, for example. Other types of switches will be apparent to those of ordinary skill in the art and may be used without departing from the scope of the present disclosure.

The internal portion 110 of the tip 106 may be supported at support element 116. In the exemplary embodiment shown, the support element 116 allows sliding and pivoting motion of the internal portion 110 of the tip. The tip 106 is further supported by an elastic element 118. The elastic element 118 allows lateral motion of the external portion 108 of the tip 106, as indicated by arrow 120, and axial motion of the external portion 108 of the tip 106 as indicated by arrow 122. The corresponding motion of the internal portion 110 of the tip 106 causes the lateral and/or axial switches to be activated.

In some exemplary embodiments, the lateral and/or axial switches provide haptic feedback to the user when they activated or de-activated. The haptic feedback enables the user to feel when a switch has been activated or de-activated. The haptic feedback may be provided by the switches themselves or by a small shaker located in the stylus. Alternatively, or in addition, the user may be provided with an audible feedback, in the form of a 'click' for example, when a lateral or axial switch is activated or de-activated. The audible feedback may be provided by the external electronic device in response to a communicated state of the one or more lateral switches, by an acoustic source of the stylus, or by the mechanical components of the switches themselves.

The stylus 100 may also include a force sensor 124 responsive to an axial force between the tip 106 and the stylus body 102 acting in the direction of the longitudinal axis 104. The force sensor 124 may be placed (as shown) in parallel with the axial switch 114, in or placed in series with the axial switch 114. The force sensor provides an output signal that may be communicated to an external electronic device as an analog signal or a digital signal.

Figure 2:
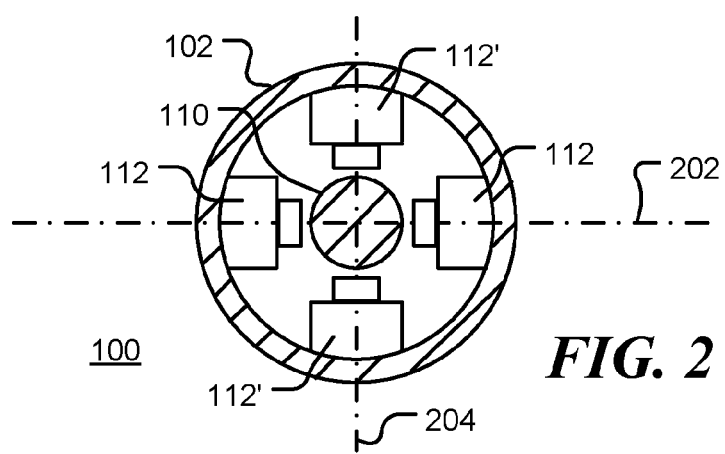
FIGS. 2-4 are sectional views of a stylus showing lateral switches, in accordance with exemplary embodiments of the present disclosure.

A sectional view through the section 2-2 in FIG. 1 is shown in FIG. 2.

FIG. 2 is a sectional view of a stylus 100 showing lateral switches, in accordance with exemplary embodiments of the present disclosure. In the configuration shown in FIG. 2, the one or more lateral switches includes first and second switches 112 diametrical opposed within the stylus body 102 and activated by lateral motion of the internal portion 110 of the tip in the direction of a first lateral axis 202, together with third and fourth switches 112' diametrical opposed within the stylus body 102 and activated by lateral motion of the internal portion 110 of the tip in the direction of a second lateral axis 204. A general motion lateral of the stylus tip may active a single switch or multiple switches. In one exemplary embodiment, the switch states are combined in a logic circuit.

It will be apparent to those of skill in the art that a different number of lateral switches may be used. For example, two orthogonal switches that operate in both push and pull modes may be used. Alternatively, three switches arrange at approximately 120° intervals around the longitudinal axis may be used. Also, in FIG. 2, the internal portion 110 of the tip is shown with a circular cross-section; however, other cross-section shapes, such as square, rectangular or triangular, for example, may be used without departing from the scope of the present disclosure. In the exemplary embodiment shown in FIG. 2, relative lateral motion between the tip 106 and the body 102 activates the switches 112.

Figure 3:
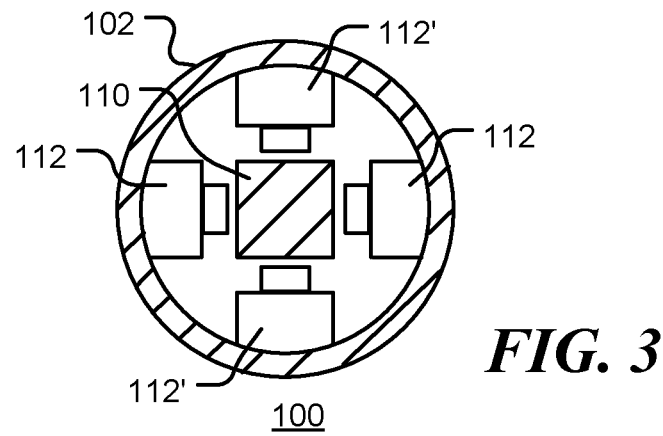

FIG. 3 shows an exemplary embodiment in which the internal portion 110 of the tip has a square cross-section.

Figure 4:
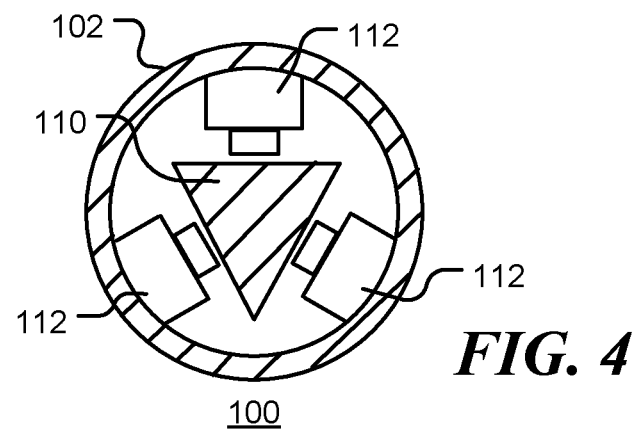

FIG. 4 shows an exemplary embodiment in which the internal portion 110 of the tip has a triangular cross-section and three lateral switches 112 are used.

Figure 5:
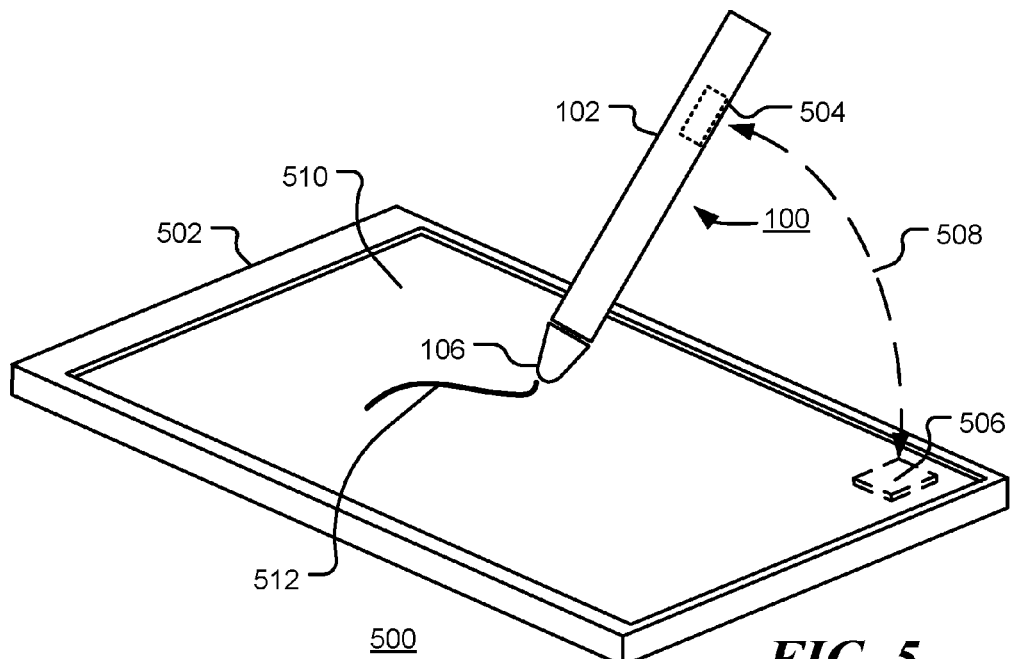
FIG. 5 is a diagrammatic representation of a system utilizing a multi-control stylus in accordance with exemplary embodiments of the present disclosure.

FIG. 5 is a diagrammatic representation of a system 500 utilizing a stylus 100 in accordance with exemplary embodiments of the present disclosure. The system 500 includes a stylus 100 and a host electronic device 502. In operation, an output circuit 504 in the stylus body 102 communicates with a transceiver circuit 506 of the electronic device 502 via a wireless link 508. In an alternative embodiment, a wired link may be used. In use, the tip 106 of the stylus 100 makes contact with the display screen or drawing surface 510 of the electronic device 502. For example, the position of the tip 106 may be tracked and used to display a line 512 on the display screen. Alternatively, the position of the tip may be used to interact with a graphical user interface. The axial switch of the stylus 100 may be activated by causing an axial force on the tip 106. This may be done, for example, by applying pressure when the stylus is oriented substantially perpendicular to the drawing surface or display screen 510. A lateral switch may be activated by applying a lateral force to the tip 106 of the stylus. This may be done, for example, by applying pressure when the stylus at an acute angle to the display screen or drawing surface 510. The switches of the stylus 100 may be used to control aspects of an application executing on the electronic device 500.

Figure 6:
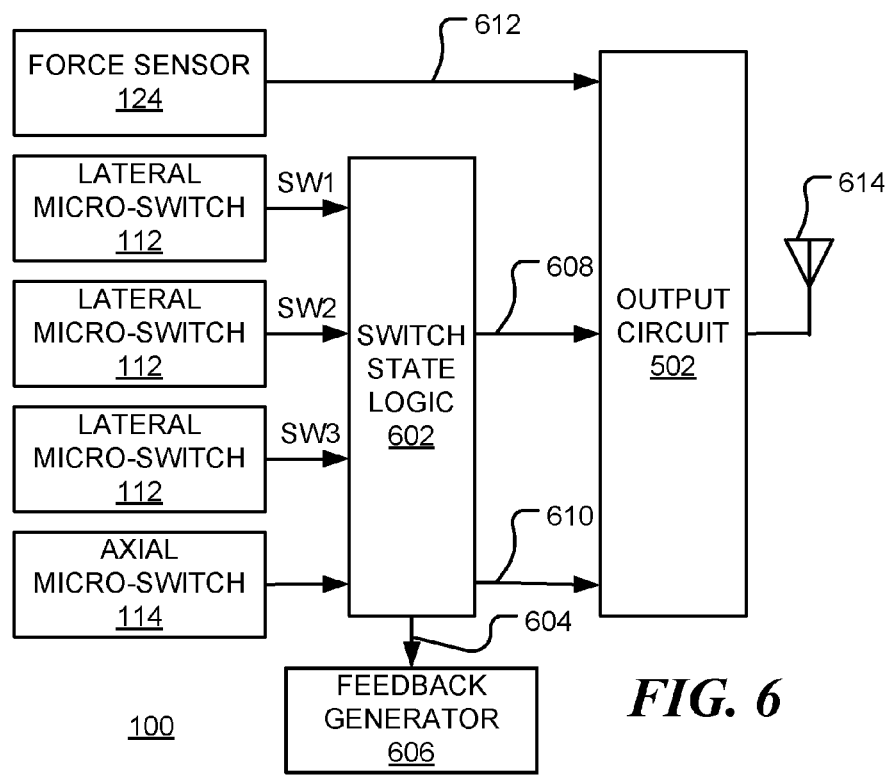
FIG. 6 is a block diagram of a stylus, in accordance with exemplary embodiments of the present disclosure.

FIG. 6 is a block diagram of a stylus 100 in accordance with exemplary embodiments of the present disclosure. The stylus 100 includes a number of lateral switches 112, an axial switch 114 and a pressure or force sensor 124. The switches are coupled to switch state logic circuit 602. In one exemplary embodiment, the switch state logic circuit 602 asserts a signal 604 to a feedback generator 606 whenever a switch, or combination of switches, is activated or de-activated. The feedback generator 606 may be a small loudspeaker or shaker or both, for example. The switch state logic circuit 602 asserts a first control signal 608 when any of the lateral switches 112 is activated and asserts a second control signal 610 when the axial switch 114 is activated. That is, the second signal has logical value (SW1 or SW2 or SW3). A third control signal 612 is produced in response to force applied to the force sensor 124. The first control signal 608, second control signal 610 and third control signal 612 are passed to output circuit 502 to be communicated to a host electronic device. The signals may be communicated via a wireless transmitter with antenna 614, for example.

Figure 7:
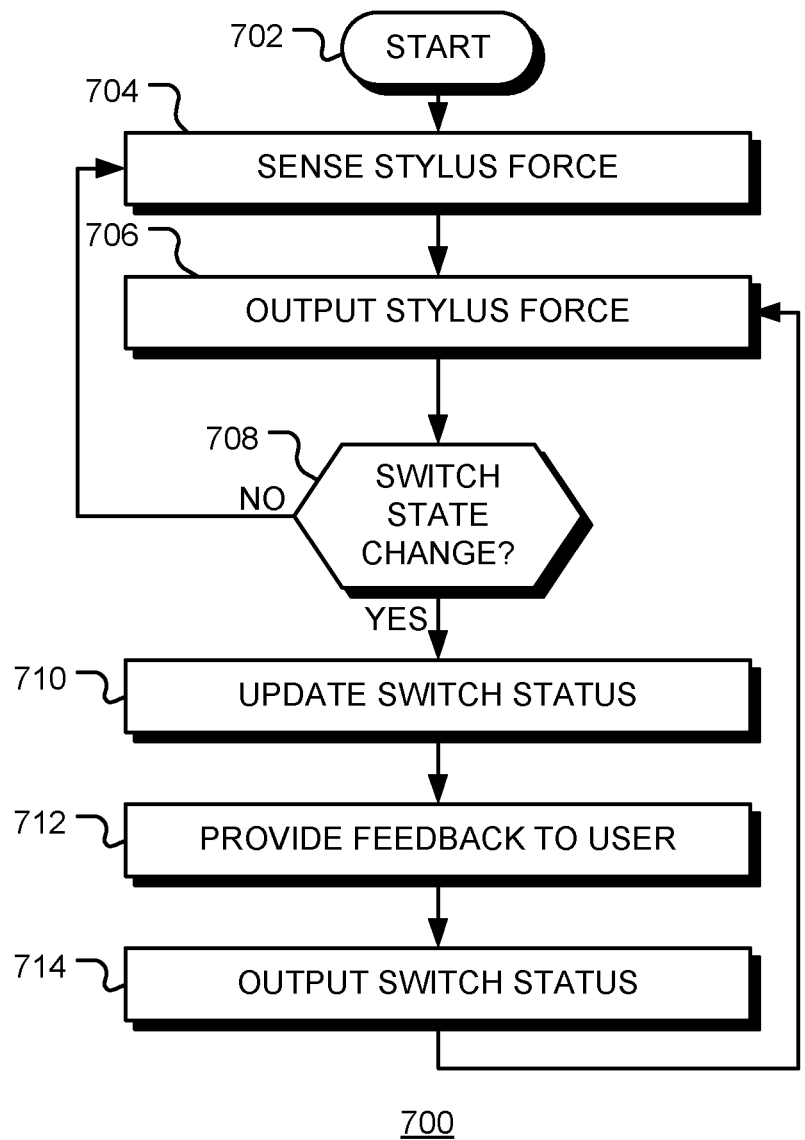
FIG. 7 is a flow chart of a method of operation of a stylus, in accordance with exemplary embodiments of the disclosure.

FIG. 7 is a flow chart of a method 700 of operation of a stylus in accordance with exemplary embodiments of the disclosure. The method provides input to a host electronic device from a stylus. The stylus includes one or more lateral switches and may also include an axial switch and an axial force sensor. The stylus has a longitudinal axis and first and second lateral axes perpendicular to the longitudinal axis. Following start block 702, the axial force applied to the stylus along the longitudinal axis is sensed at block 704. At block 706, the axial force is output to the host electronic device. At decision block 708, it is determined if a change of state has occurred in a switch, or combination of switches, of the stylus. If no change of state has occurred, as depicted by the negative branch from decision block 708, flow returns to block 704. If a change of state has occurred in a switch or switch combination, as depicted by the positive branch from decision block 708, the switch status is updated at block 710. For example, a first control signal may be asserted if any of lateral switches is activated. If one lateral switch is already activated, activation of a second lateral switch may not change the status. Similarly, if two lateral switches are activated, de-activation of one switch may not cause a change in the first control signal. However, the stylus may be configured such that any change in state of the axial switch will cause a change in a second control signal.

At block 712, feedback is provided to the user to confirm that the switch status has changed. In one exemplary embodiment, the feedback in a generated by the mechanical properties of the switches themselves, as in a computer mouse button, which may produce a combination of haptic (tangible) feedback that can be felt by the user and audible feedback that can be heard by the user. In a further exemplary embodiment, the feedback is generated using one more transducers in the stylus, such as a small loudspeaker or shaker or both. The feedback for a lateral switch state change may have a different characteristic to the feedback for an axial switch state change. In a still further exemplary embodiment, an audible feedback is generated by an external electronic device in response to a signal from the stylus. At block 714 the switch status is output to the host electronic device. The output signal may comprise, for example, a first control signal indicative of the lateral switch state, a second control signal indicative of the axial switch state, and a third control signal indicative of the axial force applied to the stylus. These control signals enable control of selected aspects of the host electronic device and may be communicated over a wired or wireless communication link. Flow then returns to block 704. While the method 700 has been depicted as a serial flow in FIG. 7, it will be apparent to those of ordinary skill in the art that the elements may be performed in parallel or a mixture of serial and parallel elements, or may be performed in response to interrupts or events.

The control signals may be received by an electronic device and used to control a computer application executing on one or more processors of the electronic device. In operation, the processor receives a first and second control signals from the stylus. The first control signal is responsive to activation of one or more lateral switches of the stylus by lateral motion of a tip of the stylus, while the second control signal responsive to activation of an axial switch of the stylus by axial motion of the tip of the stylus. Dependent upon the first and second control signals, the processor controls operation of the application executed on the processor. A third control signal, responsive to axial force on the stylus may also be received to provide further control of the application. Computer instructions to control the application may be stored on transient or non-transient computer readable media that can be accessed by the application. The instructions may be stored at any location, such as a local location or a location remote from the electronic device that is accessible via a network, for example. Further, the application may be executed on one or more processors remote from the electronic device.

The implementations of the present disclosure described above are intended to be merely exemplary. It will be appreciated by those of skill in the art that alterations, modifications and variations to the illustrative embodiments disclosed herein may be made without departing from the scope of the present disclosure. Moreover, selected features from one or more of the above-described exemplary embodiments may be combined to create alternative embodiments not explicitly shown and described herein.

The present disclosure may be embodied in other specific forms without departing from its spirit or essential characteristics. The described exemplary embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A stylus, comprising:
a stylus body;
a tip having an internal portion constructed and arranged to permit relative lateral displacement between the internal portion of the tip and the stylus body;
at least one switch positioned in proximity to the internal portion of the tip and responsive to the relative lateral displacement;
an axial switch positioned in proximity to the internal portion of the tip and responsive to relative axial motion between the tip and the stylus body along a longitudinal axis of the stylus body;
a force sensor responsive to an axial force acting between the tip of the stylus and the stylus body in the direction of a longitudinal axis of the stylus body, wherein the force sensor is separate and distinct from the at least one switch and the axial switch; and
an output configured to communicate
a first control signal, dependent upon a state of the at least one switch, to an external electronic device, and
a second control signal, indicative of a sensed axial force at the force sensor, to the external electronic device.

2. The stylus of claim 1, wherein the at least one switch is not responsive to relative motion between the tip and the stylus body along a longitudinal axis of the stylus body.

3. The stylus of claim 1,
wherein the output is further configured to communicate a third control signal, dependent upon a state of the axial switch, to an external electronic device.

4. The stylus of claim 1, wherein the at least one switch, independently or in combination, cause haptic feedback when activated or de-activated.

5. The stylus of claim 4, further comprising a shaker, wherein the haptic feedback is provided by the shaker.

6. The stylus of claim 1, wherein the at least one switch, independently or in combination, causes audible feedback when activated or de-activated.

7. The stylus of claim 6, wherein the audible feedback is provided by the external electronic device in response to a communicated state of the at least one switch.

8. The stylus of claim 6, further comprising an acoustic source, wherein the audible feedback is provided by the acoustic source.

9. The stylus of claim 1, wherein the at least one switch comprises:
first and second switches diametrically opposed within the stylus body and activated by lateral motion of the internal portion of the tip in the direction of a first lateral axis substantially perpendicular to a longitudinal axis of the stylus body; and
third and fourth second switches diametrically opposed within the stylus body and activated by lateral motion of the internal portion of the tip in the direction of a second lateral axis substantially perpendicular to the longitudinal axis of the stylus body.

10. The stylus of claim 1, further comprising:
an elastic element configured to support the internal portion of the tip within the stylus body.

11. A method for providing input to an electronic device from a stylus, comprising:
activating a first switch located in a body of the stylus in response to a force applied to a tip of the stylus in a direction of a first lateral axis substantially perpendicular to a longitudinal axis of the stylus;

sending a first control signal to the electronic device in response to activating the first switch;

activating an axial switch located in the body portion of the stylus in response to a force applied to the tip of the stylus in a direction of the longitudinal axis;

sending a second control signal to the electronic device in response to activating the axial switch;

activating a force sensor positioned in proximity to a portion of the tip within the body of the stylus in response to the force applied to the tip of the stylus in the direction of the longitudinal axis, wherein the force sensor is separate and distinct from the axial switch; and sending a third control signal to the electronic device in response to activating the force sensor.

12. The method of claim 11, further comprising:
activating a second switch located in the body of the stylus in response to a force applied to a tip of the stylus in a direction of a second lateral axis substantially perpendicular to a longitudinal axis of the stylus; and sending a fourth control signal to the electronic device in response to activating the second switch.

13. The method of claim 11, further comprising:
providing a haptic feedback to a user of the stylus in response to activating the first switch.

14. A method for providing input to an electronic device from a stylus, the method comprising:
in response to activation of at least one switch of a plurality of switches by relative lateral motion between a tip of the stylus and a body of the stylus, sending a first control signal to the electronic device;

activating an axial switch located in the body portion of the stylus in response to a force applied to the tip of the stylus in a direction of the longitudinal axis;

in response to activation of an axial switch by relative axial motion between the top of the stylus and the body of the stylus along a longitudinal axis of the body of the stylus, sending a second control signal to the electronic device;

in response to activation of a force sensor that is separate and distinct from the axial switch, sending a third control signal to the electronic device.

15. The method of claim 14, wherein the force sensor is activated in response to an axial force between the tip of the stylus and the stylus body, and wherein the third control signal is
characteristic of the sensed axial force.

16. The method of claim 14, further comprising:
generating a haptic feedback to a user of the stylus in response to activation of one or more switches of the plurality of switches or the axial switch.

17. The method of claim 14, further comprising:
generating an audible feedback to a user of the stylus in response to activation of one or more switches of the plurality of switches or the axial switch.

18. A non-transitory computer-readable medium having computer-executable instructions for controlling an electronic device dependent upon input from a stylus that, when executed by a processor of the electronic device, cause the processor to:
receive a first control signal from a stylus, the first control signal responsive to activation of at least one switch of the stylus by relative lateral motion between an internal portion of a tip of the stylus and a stylus body;

receive a second control signal from the stylus, the second control signal responsive to activation of an axial switch of the stylus by relative axial motion between the internal portion of the tip of the stylus and the stylus body;

responsive to the first and second control signals, control an application executed on the processor;

receive a third control signal from the stylus, the third control signal responsive to an axial force acting between the tip of the stylus and the stylus body, the third control signal being separate and distinct from the first and second control signals; and responsive to the third control signal, control the application executed on the processor.

* * * * *